(12) United States Patent
O'Reilly

(10) Patent No.: US 6,411,818 B1
(45) Date of Patent: Jun. 25, 2002

(54) ASSESSING PATH IMBALANCE IN MOBILE COMMUNICATIONS NETWORKS

(75) Inventor: Andrew O'Reilly, Liberty Lake, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/501,475

(22) Filed: Feb. 9, 2000

(30) Foreign Application Priority Data

Feb. 9, 1999 (GB) .............................................. 9902745

(51) Int. Cl.[7] .............................................. H04B 7/00
(52) U.S. Cl. ...................... 455/522; 455/67.1; 455/422
(58) Field of Search ........................... 455/522, 68, 69, 455/70, 67.1, 127, 422; 370/318

(56) References Cited

U.S. PATENT DOCUMENTS 5,732,328 A  *  3/1998  Mitra et al. .................. 455/522

FOREIGN PATENT DOCUMENTS

WO          WO 96/31009          10/1996

* cited by examiner

*Primary Examiner*—Doris H. To

(57) ABSTRACT

Path imbalance in a mobile communications network, as between signals received by a mobile station from a base station and signals from the mobile station received at the base station, is derived with reference to the maximum power control level of a class of mobile station chosen as a reference, rather than for each mobile class individually. As a result the processing burden involved in deriving the path imbalance is significantly reduced.

6 Claims, 2 Drawing Sheets

ASSESSING PATH IMBALANCE IN MOBILE COMMUNICATIONS NETWORKS

TECHNICAL FIELD

This invention relates to the assessment of path imbalance in mobile communications networks, for example GSM mobile telephone networks.

BACKGROUND ART

Mobile communications networks, such as GSM mobile telephone networks, are showing continued rapid growth in deployment and adoption by users. Accordingly it is increasingly important that the design and operation of such networks are implemented to provide effective and efficient use of scarce radio spectrum resources.

A key parameter in GSM mobile telephone networks is the difference in received signal strengths at a mobile station (MS), such as a telephone handset, and at a fixed base station (BS) communicating with that MS. Network operators plan their network according to several parameters, including a target path imbalance figure that is chosen based on various characteristics such as the type of base station equipment to be used and the maximum transmit power for a selected one of several possible classes of mobile station defined for GSM systems.

Assessing the actual path imbalance figure achieved across a network can assist a network operator in highlighting areas of the network that are not performing as expected, e.g. because of faults in base station transmitter or receiver circuits. This can be accomplished in a GSM network, for example, by using messages which are received in base station controllers (BSCs) from their associated base transceiver stations (BTSs), and which contain received signal level (Rx Level) measurements both for the MS (measured at the BS) and for the BS (measured by the MS).

However, these Rx Levels must be corrected for the effect of power control in the relevant transmitter circuits, because path imbalance is defined assuming that both the MS and the BS are transmitting at full power. As the different possible classes of MS have different maximum transmit powers, using conventional methods a path imbalance figure must be calculated for each specific class (combining path imbalance figures for different mobile classes would distort the result). This requires significant processing effort to implement, especially as multiple messages relating to a call involving an MS must be tracked to enable the relevant MS class to be determined (from one kind of message) and associated with the signal level measurements for that MS (from other messages of a different kind).

It is an object of this invention to facilitate the derivation of path imbalance figures.

DISCLOSURE OF INVENTION

According to one aspect of this invention there is provided a method of assessing path imbalance in a mobile communications network having mobile stations in at least two classes of different maximum signal transmission power level, comprising the steps of:

selecting one of said classes as a reference class;

setting a reference mobile station power level equal to the maximum signal transmission power level of said reference class;

receiving a message from a mobile station indicative of the strength of signals transmitted by a base station and received by the mobile station, and of a power control level currently in use by the mobile station;

determining the strength of signals transmitted by the mobile station and received by the base station, and the power control level currently in use by the base station; and determining the path imbalance in accordance with the relationship Imbalance=(*MS* RxLevel+n*(*MS* Power Control Level−Reference *MS* Power Level))−(*BS* Rx Level+n*BS* Power Control Level)

where MS Rx Level is the strength of signals transmitted by the mobile station and received by the base station; MS Power Control Level is the power control level currently in use by the mobile station; Reference MS Power Level is said reference mobile station power level; BS Rx Level is the strength of signals transmitted by a base station and received by the mobile station; BS Power Control Level is the power control level currently in use by the base station; and n is a predetermined constant.

The value of n may vary depending on the specific network technology used; for a GSM network it will have a value of 2.

BRIEF DESCRIPTION OF DRAWINGS

A method and apparatus in accordance with this invention for assessing path imbalance in a mobile communications network will now be described, by way of example, with reference to the accompanying drawings, in which.

BEST MODE FOR CARRYING OUT THE INVENTION, & INDUSTRIAL APPLICABILITY

Figure 1:
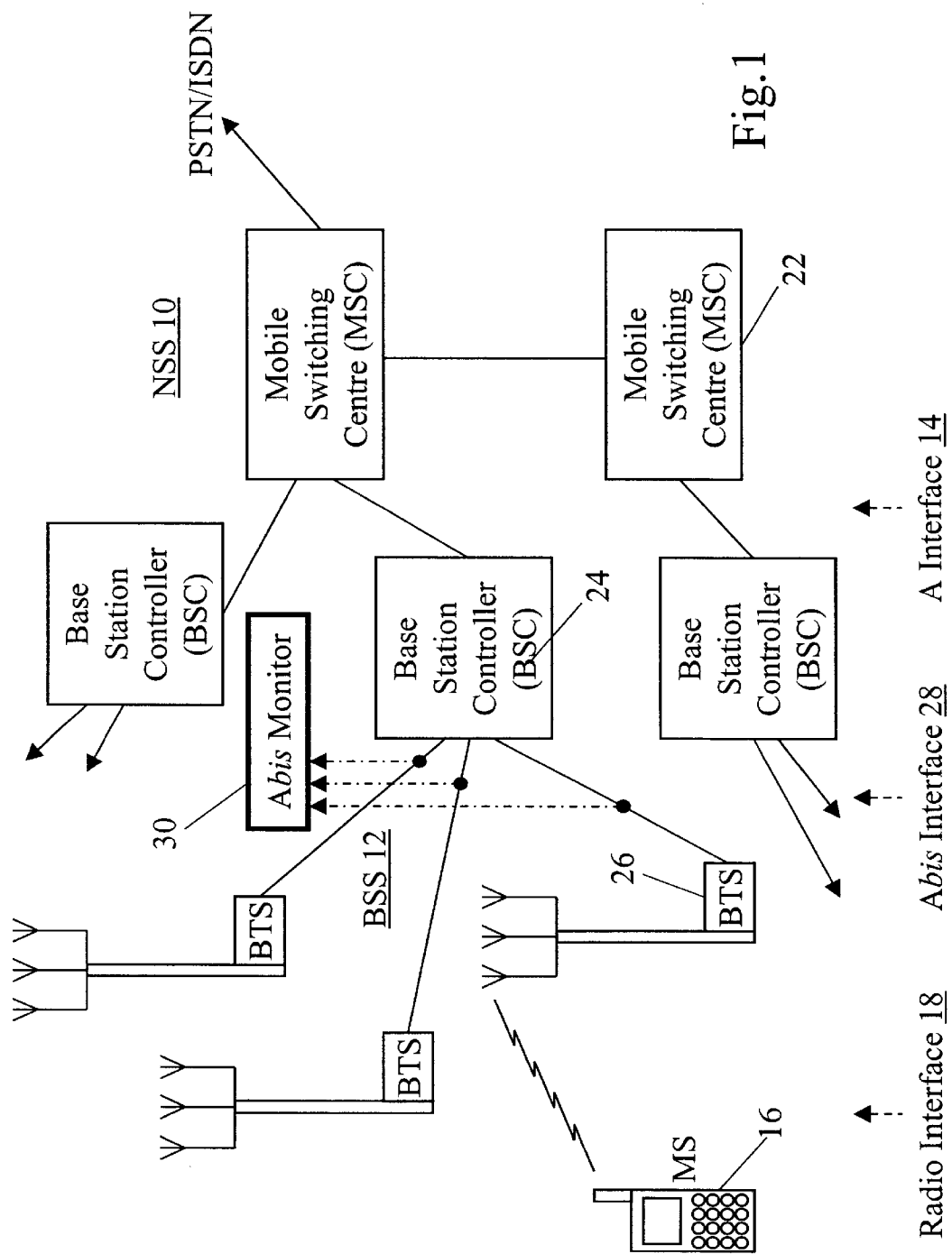
FIG. 1 shows a portion of a mobile communications network, including a device for monitoring Abis interface links.

FIG. 1 shows the principal elements of a typical mobile communications network, in this case a GSM mobile telephone network. Referring to FIG. 1, the illustrated GSM network comprises a Network and Switching Subsystem (NSS) 10, which connects with a plurality of Base Station Subsystems (BSS) 12 across an 'A' interface 14. The BSSs 12 provide radio communication with mobile stations (MSs) 16 (only one of which, a telephone handset, is shown in FIG. 1) across a radio interface 18. The NSS 10 also communicates with the fixed public network, that is with the Public Switched Telephone Network (PSTN) and the Integrated Services Digital Network (ISDN). The NSS 10 comprises a number of Mobile Switching Centres (MSCs) 22 and other apparatus such as Home Location Registers and Visitor Location Registers (not shown). The MSCs 22 perform the function of switches, in a similar manner to PSTN switches, and also deal with the additional functionality required for mobile networks, such as registration, authentication, location updating, international roaming and connection to the fixed public network.

Each BSS 12 comprises a Base Station Controller (BSC) 24 and a plurality of Base Transceiver Stations (BTSs) 26. Although not shown in FIG. 1, each BTS 26 comprises one or more elementary transceivers (TRXs) and at least one Base Controller Function (BCF). Each TRX can emit and receive radio signals across the radio interface 18 and provides radio coverage over a local area known as a cell. The number of TRXs per cell and the number of cells per BTS 26 is dependent upon the traffic capacity that the network operator wishes to cater for.

The radio interface 18 between an MS 16 and a BTS 26 is standardised within a GSM network. Similarly, the interface between each BTS 26 and its associated BSC 24, by which user data and signalling are exchanged, is also standardised, and is known as the Abis interface 28.

In GSM networks user data and signalling are multiplexed across the radio interface 18, the Abis interface 28 and the A interface 14. Signalling within the NSS 10, over the A interface to the BSCs 24, and with the fixed public network is effected through signalling links which utilise signalling schemes based on the international Signalling System No.7 (SS7) standard.

One parameter relating to network configuration which network operators wish to monitor is path imbalance, i.e. the difference between the signal strength received by the MS 16 from the BTS 26 and the signal strength received by that BTS 26 from the same MS 16. This is because a departure from the design value of path imbalance is indicative of a possible malfunction in the BTS, involving either its transmitter or receiver circuitry.

Mobile communications networks require exchange of control information between the MS 16 and the network infrastructure 10, 12. To this end, the GSM standard specifies various control channels, typically in terms of their time of occurrence in a cyclic time division multiple access scheme and their frequency of transmission. One particular such channel which is relevant in the present context is the Slow Associated Control Channel (SACCH), which carries signalling required for the management of an active connection with the MS 16.

SACCH messages convey various items of information, including commands from the BSCs and BTSs to the MS 16 relating to timing advance and transmission power control of signals transmitted by the MS, and, in the specific case of SACCH Measurement Report messages, reports from the MS 16 of the measured strength of signals it is receiving from BTSs (BS Rx level) and of the transmission power control level it is currently using.

In GSM900 systems MS power control level is reported as a value from, for example, 0 to 31, though values 0, 1 and 2 all indicate the maximum power level (for which the value 2 is actually used), and values 19 to 31 all indicate the minimum power level (for which the value 19 is actually used). The adjacent values in the range 2 to 19 correspond to steps of 2 dB in power level.

The BTSs themselves perform measurements of the strength of signals received from the MS 16 (MS Rx level), and forward these measurements, together with the parameters reported by the MS 16, to the associated BSC 24 in Measurement Result messages sent via the Abis interface 28.

Another parameter which is communicated from the MS 16 to the BTS 26 and BSC 24 (though not via SACCH messages) is the transmission power class of the MS 16. Currently the GSM standard defines five such power classes for MS equipment operating in the 900 MHz band, for example, as follows:

| Class | Max transmission power control level |
|---|---|
| 1 | 20 W |
| 2 | 8 W |
| 3 | 5 W |
| 4 | 2 W |
| 5 | 0.8 W |

Conventionally path imbalance has been derived, for example in the BSCs 24, for each MS power class separately according to the following relationship:

Path imbalance (class)=[$MS$ $Rx$ level+2*($MS$ power control level−max power control level of $MS$ class)]−[$BS$ $Rx$ level+2*$BS$ power control level]

Typically the path imbalance is determined as successive Rx level measurements become available, and a moving average is maintained over some predetermined number of these measurements, such as one thousand, or over a predetermined period, such as one day. This average is then used as the path imbalance figure for the respective MS power class. It is noted that the expression (MS power control level−max power control level of MS class) in this relationship has a minimum value of zero, since the maximum level is indicated by the numerically lowest value.

However, this approach is complex to implement. The parameters BS Rx level and MS power control level are reported by the MS via the SACCH Measurement Report messages; MS Rx level and BS power control level are determined in the relevant BTS 26 and all four of these values are forwarded in Measurement Result messages to the BSC 24 via the Abis interface 28. Thus these four values are all readily available together. On the other hand, the remaining required parameter, max power control level for the relevant MS class, is not directly available, because it requires knowledge of the transmission power class of the MS 16 and this is not reported in an SACCH message, nor indeed frequently. Typically it is reported at the beginning of each new connection involving the MS 16. Therefore, to assess path imbalance for each MS class, it is necessary to track each connection individually, in order to be able to associate the MS class reported at the start with the Measurement Result messages received subsequently. In addition, separate average path imbalance figures must be maintained for each such class. All this imposes a substantial processing burden on the system which derives the path imbalance figures.

In accordance with this invention, the path imbalance value is derived for a single, pre-selected MS class, namely the MS class selected by the network operator in specifying the target path imbalance figure during network design. In practice this may be, for example, the MS class most commonly used in the network. The maximum transmission power control level (lowest numerical value) of this chosen class is used as the Reference MS power level in deriving a path imbalance figure according to the relationship:

Path imbalance (reference class)=[$MS$ $Rx$ level+2*($MS$ power control level−Reference $MS$ power level)]−[$BS$ $Rx$ level+2*$BS$ power control level]

It is noted that the expression (MS power control level−Reference MS power level) can have values which are negative, if, for example, the maximum transmission power of the reference MS class is lower (i.e. is indicated by a larger numeric value) than the actual transmission power of the MS whose Rx level and power control level are being incorporated in the derivation.

This enables a path imbalance figure for a single MS class (the selected reference class) to be derived from measurements relating to multiple MS classes. This is significantly easier to implement than previous techniques, because each measurement report can be treated independently—the actual MS class associated with each power level measurement does not need to be known, so it is not necessary to track the progress of each call for its entirety.

Figure 2:
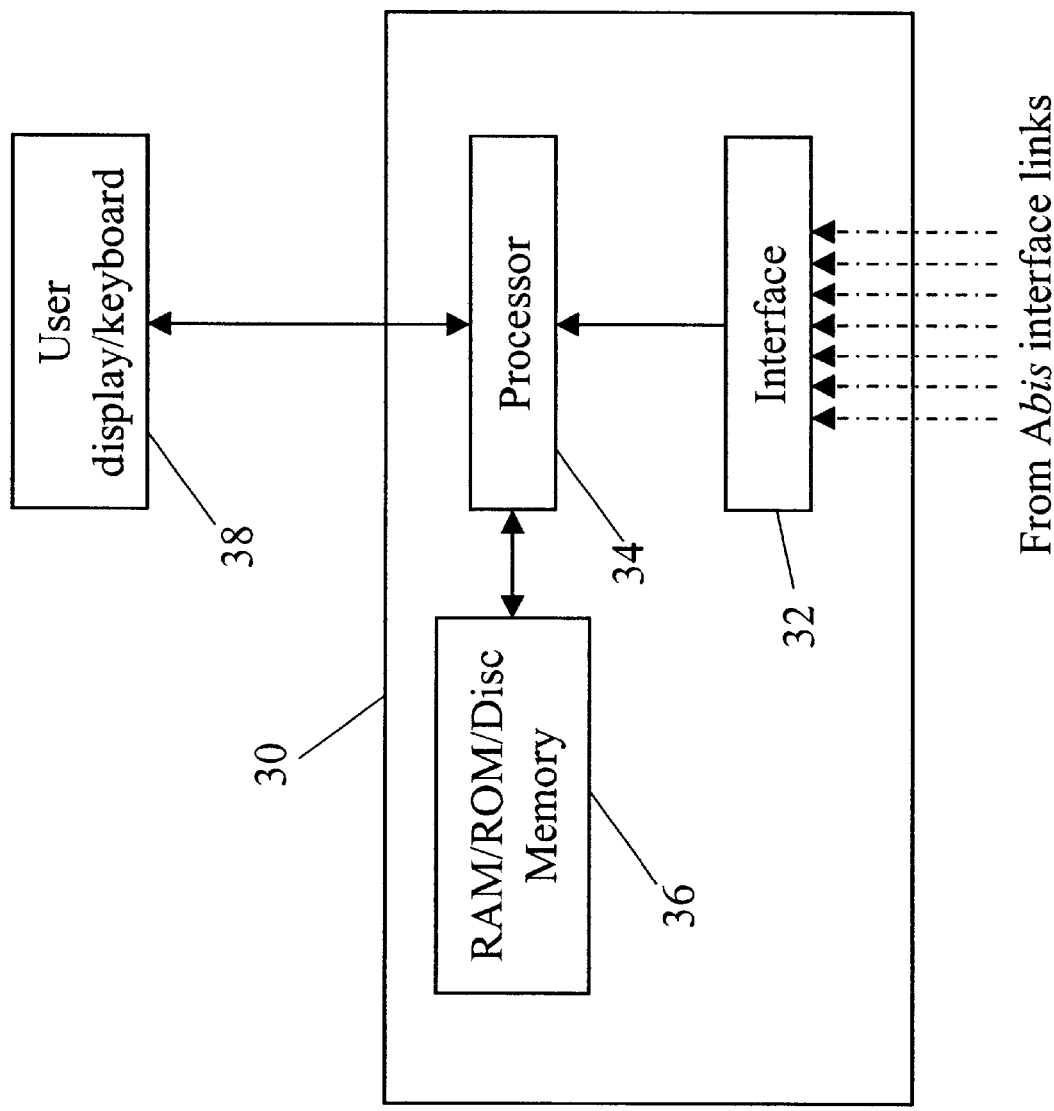
FIG. 2 is a schematic block diagram of the monitoring device.

Because all the information required for this new path imbalance derivation is contained in at least some of the Measurement Result messages traversing the Abis interface 28, the derivation can conveniently be performed by a device passively monitoring this interface, such as the monitor 30 shown in FIGS. 1 and 2. Referring to FIG. 2, the monitor 30 has an interface 32 which is coupled to the links comprising the Abis interface 28 passively, i.e. to create copies of the signalling messages traversing those links without disturbing or altering the messages on the links themselves. In the case of electrical links this can be accomplished with, for example, appropriate transformer or high-value resistance coupling, and in the case of optical links by use of an optical power splitter. The message copies are provided by the interface 32 to a processor 34 which implements instructions in a software or firmware program stored in a memory 36 containing RAM, ROM and disc memory for data storage as required. The processor 34 discards copies of Measurement Result messages from which any of the required parameters is absent, e.g. because a BTS has lost contact with the MS. The processor then extracts data (in particular the Rx level and power control level values) from the remaining message copies, in accordance with the formats of those messages defined in the system specifications, and derives the path imbalance figure for the reference MS class in accordance with the expression given above. This figure is in turn used to update the moving average path imbalance figure over the preselected number of measurements or averaging period.

The updated path imbalance is forwarded by the processor 34, for example via a local area network (LAN), to a central facility such as a computer in a system management centre, where it may be displayed on a network supervisor's workstation 38 (possibly after comparison with a preset alarm or alert threshold).

Although the invention has been described in the illustrative example above by reference to GSM networks, it may be used in other kinds of mobile communications networks, included DCS1800 and PCS1900 networks. In the case of these two kinds of networks the usage of power control level values for reporting MS power control is more complex, and some manipulation of MS power control level and Reference MS power level values is required before the path imbalance figure is derived. Specifically these level values should be altered as follows:

| Nominal value | DCS1800 Value used | PCS1900 Value used |
|---|---|---|
| 16–28 | 15(=0 dBm) | [Not defined] |
| 0–15 | Reported value (=30 − 0 dBm) | Reported value |

-continued

| Nominal value | DCS1800 Value used | PCS1900 Value used |
|---|---|---|
| 29 | −3(=36 dBm) | [Not defined] |
| 30 | −2(=34 dBm) | −1.5 |
| 31 | −1(=32 dBm) | −1 |

What is claimed is:

1. A method of assessing path imbalance in a mobile communications network having mobile stations in at least two classes of different maximum signal transmission power level, comprising the steps of:

selecting one of said classes as a reference class;

setting a reference mobile station power level equal to the maximum signal transmission power level of said reference class;

receiving a message from a mobile station indicative of the strength of signals transmitted by a base station and received by the mobile station, and of a power control level currently in use by the mobile station;

determining the strength of signals transmitted by the mobile station and received by the base station, and the power control level currently in use by the base station; and determining the path imbalance in accordance with the relationship Imbalance=($MS$ $Rx$ Level+n*($MS$ Power Control Level—Reference MS Power Level))−($BS$ $Rx$ Level+n*$BS$ Power Control Level)

where MS Rx Level is the strength of signals transmitted by the mobile station and received by the base station;

MS Power Control Level is the power control level currently in use by the mobile station;

Reference MS Power Level is said reference mobile station power level;

BS Rx Level is the strength of signals transmitted by a base station and received by the mobile station;

BS Power Control Level is the power control level currently in use by the base station; and n is a predetermined constant.

2. The method of claim 1, wherein the messages received are messages traversing an Abis interface connected to the base station.

3. The method of claim 2, wherein the reference class is selected to be a class used in specifying target path imbalance figures during-design or operation of the network.

4. The method of claim 1, wherein the reference class is selected to be a class used in specifying target path imbalance figures during design or operation of the network.

5. The method of claim 4, wherein the reference class is the class of mobile station most commonly used in the network.

6. The method of claim 1, wherein n has a value of 2.

* * * * *